INVENTORS.
Ormond E. Barstow
BY William H. Parth

Earl D. Ayers
AGENT

INVENTORS.
Ormond E. Barstow
BY William H. Parth

Earl D. Ayers
AGENT

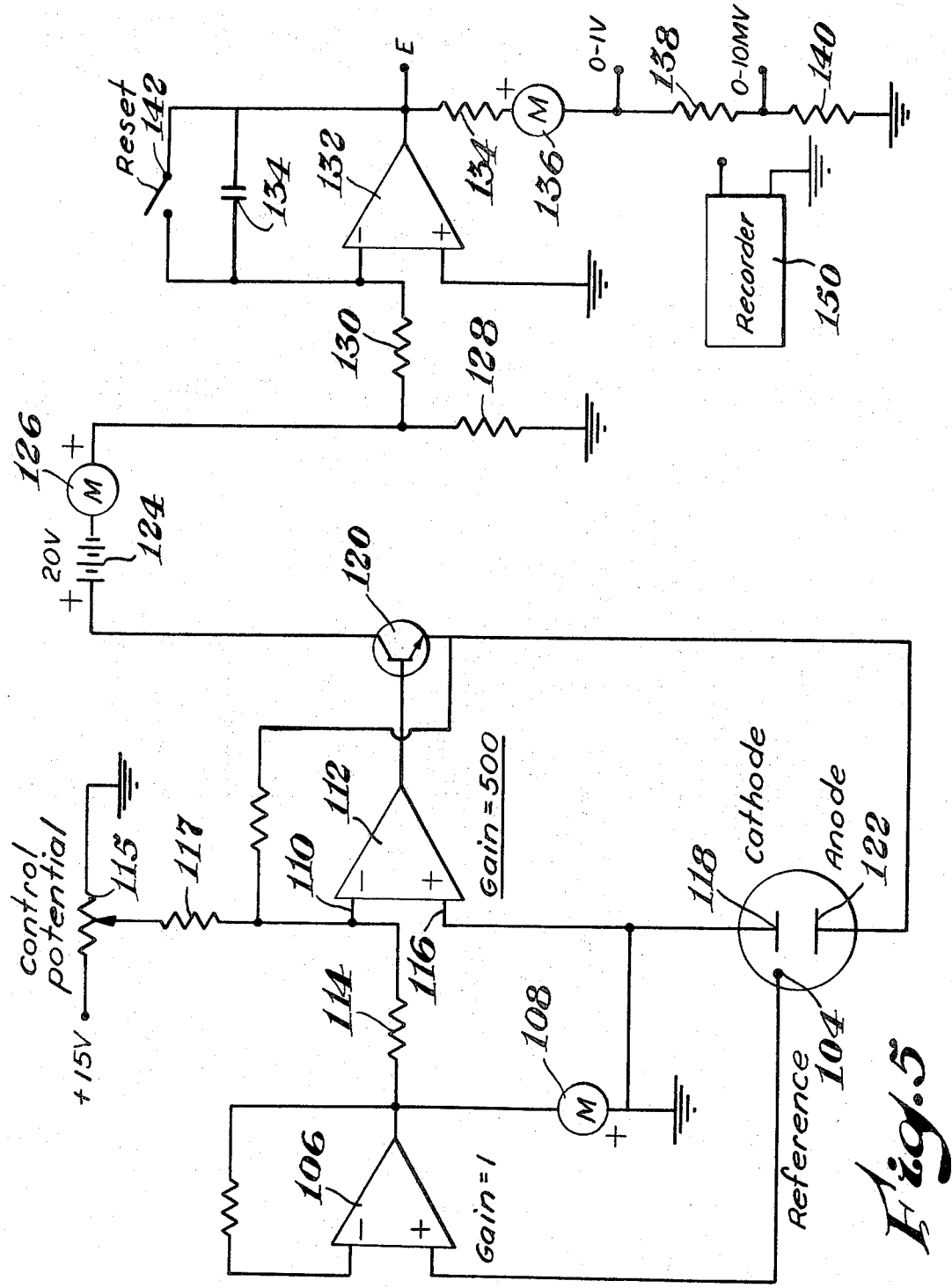

United States Patent Office 3,761,376
Patented Sept. 25, 1973

3,761,376
COULOMETRIC ANALYZER
Ormond E. Barstow, Midland, and William H. Parth, Saginaw, Mich., assignors to The Dow Chemical Company, Midland, Mich.
Filed Sept. 2, 1971, Ser. No. 177,311
Int. Cl. G01n 27/46
U.S. Cl. 204—195 R     6 Claims

ABSTRACT OF THE DISCLOSURE

The invention is a controlled potential coulometric analyzer used in measuring the concentration of chlorine in a gas. The analyzer utilizes working and auxiliary electrodes of platinum and an electrolyte of hydrochloric acid solution. The cathode or working electrode compartment is connected by liquid passages to separate compartments containing the auxiliary electrode or anode and reference electrode. When the working electrode is maintained at a potential of +375 mv. with respect to a saturated calomel electrode, the cell current is zero in the absence of chlorine.

When a volume of sample gas containing chlorine is introduced into the gas space above the cathode, the chlorine dissolves in the thin film of electrolyte, wetting the platinum gauze cathode and is reduced at the cathode. The integrated current or total charge that flows as a result of the electrolysis is proportional to the chlorine reduced, and such charge is read on suitable readout equipment.

BACKGROUND OF THE INVENTION

This invention relates to coulometric analyzers and particularly to controlled potential coulometric analyzers useful for measuring chlorine in a gas.

In many chlorination and other processes it is desirable to have knowledge of the chlorine concentration at one or more points in the processing stream.

In some applications a photometric analyzer works very well, but these are expensive.

In other applications where the chlorine is in the parts per million range, a simple potentiometric or amperometric device is adequate.

However, in many applications the above mentioned devices may be unsuited because readings are not sufficiently precise, other components in the gas stream may interfere with the reading of the instrument, the instrument may drift, or field calibration may be difficult, for example.

OBJECTS OF THE INVENTION

Accordingly, a principal object of this invention is to provide an improved coulometer device for use in measuring the concentration of chlorine and the like in mixtures of gases.

Another object of this invention is to provide improved, reliable apparatus for measuring the concentration of chlorine in mixtures of gases.

A further object of this invention is to provide improved, reliable and accurate means for measuring the concentration of chlorine in mixtures of gases.

STATEMENT OF THE INVENTION

In accordance with this invention, there is provided apparatus for determining the amount of chlorine in a mixture of gases, comprising a block-like body part having a reference electrode containing chamber, a cathode electrode containing chamber and an anode electrode containing chamber, flow path means for maintaining electrolyte in and between said chambers, and means for intermittently introducing predetermined amounts of gas mixture to said cathode electrode containing chamber.

Means are provided for adjusting the anode-cathode potential to achieve zero current in the absence of chlorine, and to read out and integrate current flow resulting from reduction of the chlorine in said predetermined amounts of gas mixture.

The invention, as well as additional objects and advantages thereof, will best be understood when the following detailed description is read in connection with the accompanying drawings, in which:

FIG. 5 is a simplified circuit diagram of apparatus coupled to the apparatus of FIG. 1.

DETAILED DESCRIPTION OF THE INVENTION

Figure 2:
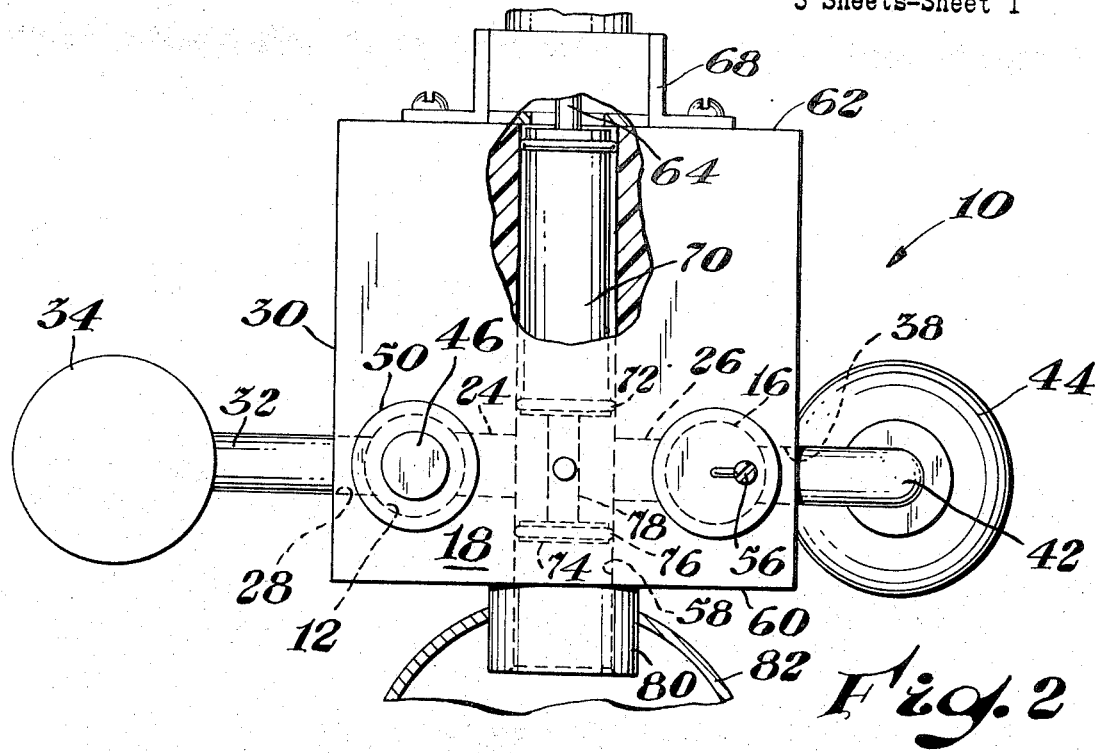
FIG. 2 is a plan view of the apparatus shown in FIG. 1.
Figure 1:
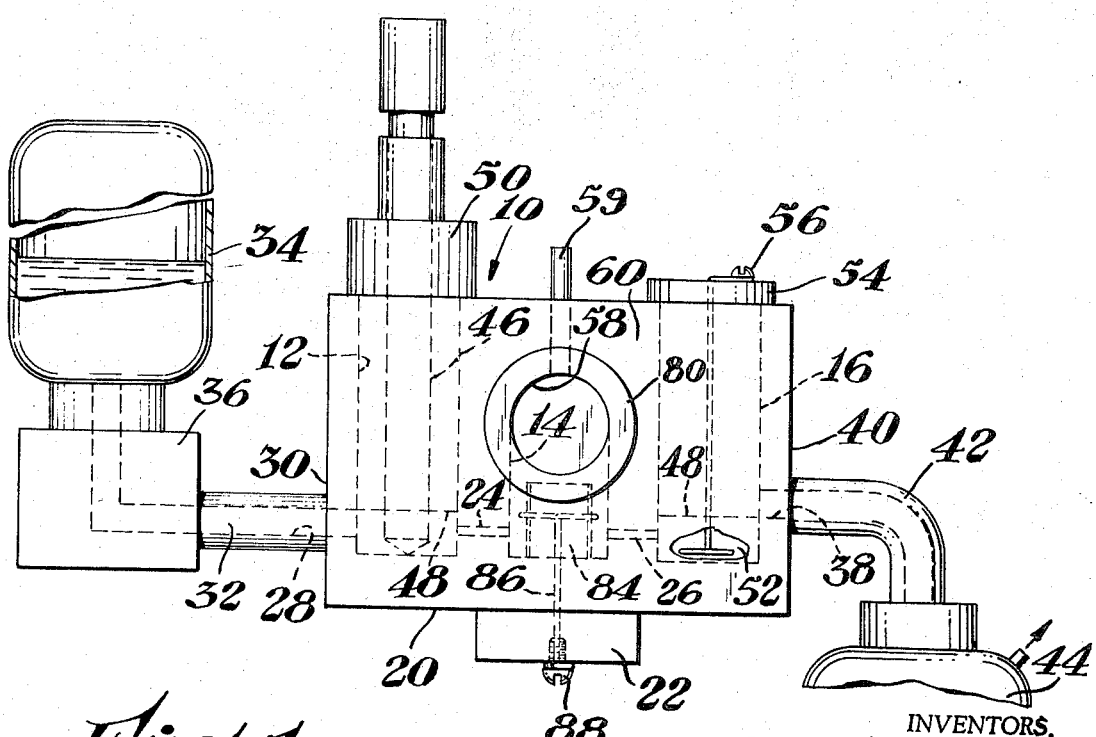
FIG. 1 is a front elevational view partly broken way and in section, of gas measuring apparatus in accordance with this invention.
Figure 3:
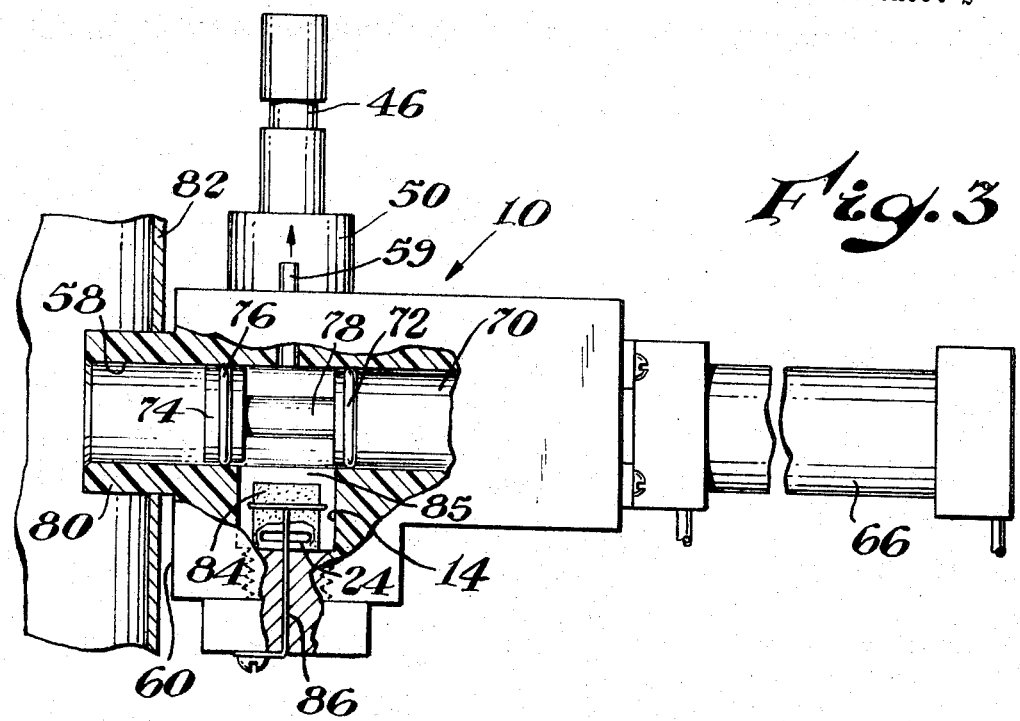
FIG. 3 is a side elevational view, partly broken away and in section, of the apparatus shown in FIG. 1.

Referring to the drawing, and particularly to FIGS. 1, 2 and 3, there is shown a block-like body part, indicated generally by the numeral 10.

The body part 10 has three axially parallel bores 12, 14, 16 extending into it, bores 12 and 16 extending into body part 10 from the top 18 and the bore 14, the center bore extending upwardly from the bottom 20, being closed at the bottom by plug 22 which extends into the bore 14.

Communication between the bores 12, 14 and 16 is provided by bores 24, 26, respectively, each of which extends from at least near the lower end of the bore 12 or 16 to the central bore 14.

An electrolyte entry bore 28 extends from the side 30 of the body part 10 to the bore 12. A line or tube 32 is coupled to the bore 28 and to an inverted bottle 34 through a coupler 36.

An electrolyte discharge bore 38 extends from the side 40 of the body part 10 to the bore 16. A tube 42 is coupled to the bore 38 and extends downward to an electrolyte overflow receiver 44, or alternatively, to a drain (not shown).

The location of the bores 28 and 38 is such that the electrolyte flows into bore 12, through bore 24 into bore 14, then through bore 26 into bore 16. Bore 38 is positioned so that the lower part of the bore is sufficiently above the bottom of bore 16 to maintain the electrolyte in all bores and at a substantial level in the bores 12, 14, 16.

A calomel reference electrode 46 is disposed in the bore 12 with its lower end immersed in the electrolyte 48 and its upper part centered in the bore 12 by a bushing 50.

An anode 52, of platinum wire, for example, extends downwardly from the cover plate 54 of the bore 16 and is imemrsed in the electrolyte 48. The screw 56 serves as a mechanical anchor and electrical terminal for the anode 52.

A bore 58 extends traversely to the bore 14 through the block 10 from the front 60 to the rear 62 thereof, communicating with the bore 14.

A retractable plunger rod 64 is coupled to suitable drive means 66 which is mechanically coupled to the back of the block-like body member 10 by brackets 68, for example.

The plunger 64 is coupled at its forward end to a cylindrical element 70 having having "O" ring seals 72, 73 in grooves at its forward and rear end. A second cylindrical element 74, much shorter than the part 70 and also having an "O" ring seal 76 in a peripheral groove therein, is rigidly coupled to the element 70 by a rod 78 which extends between the elements 70, 74.

A tubular sleeve element 80 having the same inner configuration as the bore 58, and axially aligned therewith extends from the end 60 and into the process vessel 82 from which the gas is to be analyzed.

The diameter of the rod 78 and the spacing between the cylinders 70, 74 is such that a predetermined gas sample is held in the annular space between the rod 78 and the wall of the bore 58.

A cathode electrode 84, composed of a sheet or sheets of woven platinum gauze, for example, is supported within the bore 14 by platinum wire 86 which extends through the plug 22 and is coupled to the screw type terminal 88. The lower part of the cathode 84 is immersed in the electrolyte, with the electrolyte wetting the woven cathode structure above the electrolyte level by capillary action.

Figure 4:
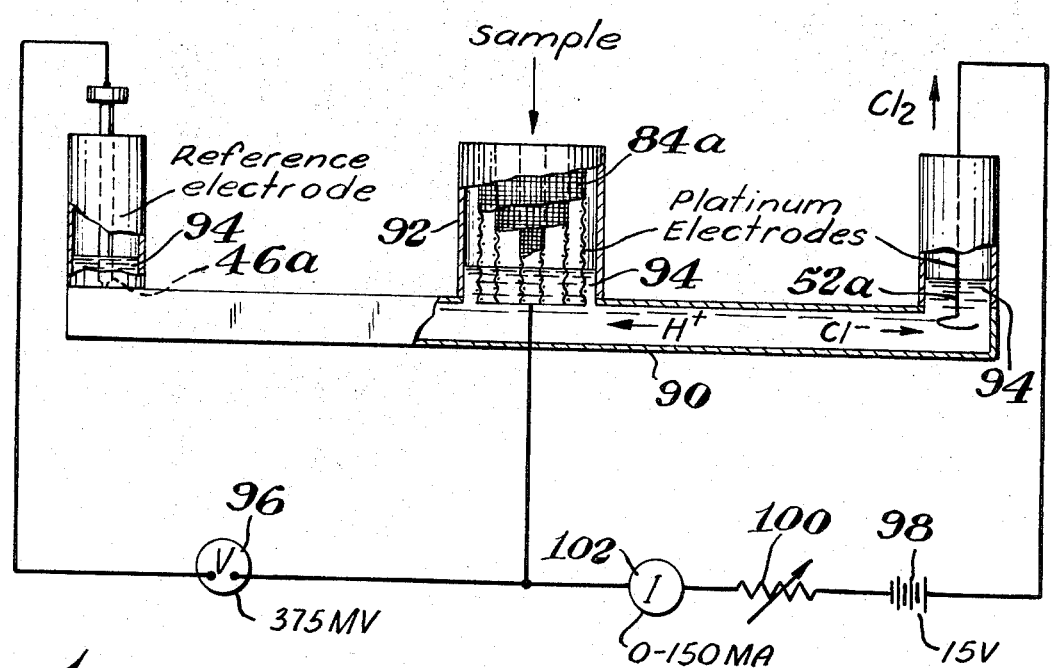
FIG. 4 is a simplified apparatus similar to the apparatus shown in FIG. 1.

Referring to FIG. 4, there is shown a simple modified U-tube type coulometric analyzer containing a platinum wire anode 52a in one outer leg of the tube 90, a calomel reference electrode 46a in the other outer leg of the tube 90, and a central chamber 92 opening on the base of the tube 90. The chamber 92 contains a platinum gauze cathode electrode 84a.

Each of the electrodes 46a, 84a and 52a is partially immersed in an electrolyte 94, such as 10 percent hydrochloric acid, for example.

The cathode 84a is coupled through millivoltmeter 96 to the calomel electrode, and is also coupled to the anode 52a in series with a 15 volt battery 98, variable resistor 100 and milliammeter 102.

The millivoltmeter 96 measures the potential of the cathode 84a with respect to the reference electrode 46a. The voltage applied across the anode 52a and cathode 84a by battery 98 (usually a 15 volt battery) is adjusted by means of the variable resistor 100 and the current is indicated by the milliammeter 102.

Before applying any chlorine-containing gas sample to the central chamber 92 cathode-anode voltage is adjusted by means of the variable resistor 100 to the highest value for which the cell current remains essentially zero.

Under these conditions, the cathode potential with respect to the reference electrode is about +375 millivolts, a potential at which no oxygen is reduced at the cathode.

When 1 cubic centimeter of pure chlorine is injected by a syringe into the chamber 92, the chlorine is reduced at the cathode, an equal amount is oxidized at the anode 52a and the milliammeter 102 indicates a current while the electrolysis proceeds.

The following reactions occur:

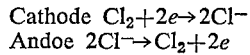

Cathode $Cl_2 + 2e \rightarrow 2Cl^-$
Andoe $2Cl^- \rightarrow Cl_2 + 2e$

According to Faraday's Law, two Faradays or 193,000 coulombs are required to reduce one gram-mol of chlorine. This corresponds to 7.89 coulombs/milliliter of $Cl_2$ at 25° C. and 760 mm. Hg. Comparison of the quantity of chlorine sampled and the integrated current shows that the electrolysis proceeds with essentially 100 percent current efficiency. Because of this the calibration or range of the instrument can be determined by computation rather than by experiment.

The simplified analyzer of FIG. 4 is workable but has the disadvantage that the chlorine reduction time (30-40 minutes or more) is too long for many process applications.

It was found during the above-described test that the biasing potential (cathode potential relative to calomel reference electrode) increased to a value in excess of 800 millivolts and gradually returned to its original value as the chlorine was reduced.

When the anode-cathode potential was manually controlled by the variable resistor 100 to maintain a cathode to reference electrode potential of roughly 375 millivolts, 99 percent of the chlorine was reduced in less than 5 minutes. It is therefore desirable to hold this cathode to reference potential down to a reasonably low value to get fast reduction of the chlorine but not low enough to cause reduction of oxygen in the sample gas, which would produce serious errors. The potential which is critical is really the cathode to electrolyte potential, and this holds constant if the cathode to reference electrode potential is held constant. This can be done of course by varying the anode to cathode voltage as the chlorine concentration in the gas sample changes.

Referring to FIG. 5, there is shown a simplified schematic diagram of the voltmeter, potential control, and integrator apparatus of the invention.

The reference electrode 104, usually a calomel electrode, is electrically coupled to an input of a unity gain high impedance amplifier 106, connected in a voltmeter circuit including a meter 108 and having its output also coupled to one input 110 of a differential type operational amplifier 112 through resistor 114. A suitable control potential, developed across a potentiometer 115 connected between a suitable source of fixed potential and ground, is also coupled to the input 110 through resistor 117.

The other input 116 of the amplifier 112 and the cathode electrode 118 are coupled to ground. The output of the amplifier 112 is coupled to the base of the transistor 120 which functions as a variable resistor and whose emitter electrode is coupled to the anode electrode 122.

The collector electrode of the transistor 120 is connected to the positive terminal of a power supply, represented by the battery 124. The other terminal of the power supply battery 120 is connected to ground through series connected milliammeter 126 and resistor 128. The ungrounded end of resistor 128 is coupled through resistor 130 to one input of amplifier 132, which is connected as an integrator. The other input of amplifier 132 is grounded.

A capacitor 134 and reset switch 142 are coupled in parallel between the output and the ungrounded input of the amplifier 132.

The output of the amplifier 132 is also coupled to ground through series connected resistor 134, meter 136, and resistors 138, 140.

In operation, the drive means 66, a reversible air cylinder, for example, extends the cylindrical element 70 into the process vessel or pipe line 82 to the point where the O-ring 72 barely remains in the bore 58 of the sleeve 80.

A good seal between the vent stack 82 and the cathode compartment 85 is desirable to avoid high chlorine readings in those cases where the stack gas contains HCl. Because HCl gas is highly soluble in water, the pressure in the cathode compartment will tend to decrease. A small vent hole 59 permits outside air to be drawn in as necessary to maintain atmospheric pressure.

The cylindrical element 70 is then retracted so that the cylindrical part 74 carrying O-ring 76 lies adjacent to the edge of the cathode compartment 85. The amount of stack gas sample contained in the previously mentioned annular space between the rod 78 and the wall of the bore 58 is then open to the cathode compartment 85.

When chlorine is present in the gas sampled, it diffuses into the thin film of electrolyte wetting the cathode 84 and is reduced. Although the rate of reduction is proportional to the cathode area, the thickness of the electrolyte film is a more sensitive parameter. In one experiment when only ⅜ inch of the platinum gauze cathode material extended above the electrolyte, the time required to reduce equal amounts of chlorine was five to six times that when the cathode extended ¾ inch above the surface of the electrolyte.

The electrolyte conveniently is 3 Normal hydrochloric acid.

The electrolyte level is maintained by means of the inverted bottle type electrolyte reservoir 34, operating on the "chicken waterer" principle, which supplies electrolyte to the compartment 12, the compartments 14 and 16 through bores 24, 26, respectively. If the electrolyte gets too high it overflows through the tube 42.

Referring to FIG. 5, as well as to FIGS. 1-3, the cathode-reference potential is supplied to amplifier 106, which has unity gain. This non-inverting amplifier presents a high impedance to the electrodes and drives meter 108 which commonly reads 0-500 millivolts.

Amplifier 112, which has a gain of about 500, compares the cathode-reference potential from amplifier 106 with the desired control potential (which is determined by resistors 114 and 117 and the setting on potentiometer 115) and amplifies any voltage difference.

The output of amplifier 112 is applied to the base of transistor 120, which acts essentially as an appropriate variable resistance and controls the voltage delivered to the cell (between anode 122 and cathode 118 in FIG. 5 or between cathode 84 and anode 52 in FIGS. 1-3) from the power supply, represented in FIG. 5 by the battery 124.

The transistor 120 is used since the amplifier 112 alone cannot pass currents up to 150 milliamperes. This circuit maintains the control potential to better than 10 millivolts.

Amplifier 132, which has a low leakage capacitor in its feedback loop, is connected as an integrator. A small fraction of the cell current (typically $10^{-6}$ in one example of the instrument shown in FIGS. 1-3) flows through the resistor 130 to charge the capacitor 134. The output voltage of the amplifier 132 is directly proportional to the time integral of the cell current.

A fraction of the output of amplifier 132 is selected across a voltage divider (resistances 134, 138, 140) and presented on a recorder or other readout device.

A relay whose contacts 142 are connected across the capacitor 134 closes once per cycle to reset the integrator to zero. This occurs during the time the plunger 70 extends into the process stream.

The analyzer has been operated with ranges of 0-10, 0-1, and 0-0.1 percent chlorine by volume. A range of 0-100 percent can be obtained by sampling a smaller volume of gas. An analysis time of less than five minutes is required in each case.

The analyzer is usually used with a timer to operate the sampling function and reset switch at regular intervals. The recorder pen (if a recorder is used) may be locked at the newest reading by the timer after each measurement, or it may be left unlocked going down to zero between measurements. Of course, the analyzer can be used manually without a timer for a single analysis.

By the choice of appropriate electrolyte and bias voltage the instrument may be used to analyze bromine in gas mixtures.

What is claimed is:

1. Coulometric analyzer apparatus for measuring the concentration of chlorine or bromine in a gas mixture, comprising a reference electrode, a chamber including an anode electrode therein, a second chamber including a cathode electrode therein, direct flow path means for maintaining electrolyte in and electrolyte flow between said chambers and in contact with said electrodes, means for intermittently introducing preedtermined amounts of gas mixture to the cathode electrode containing chamber above the electrolyte level, means for adjusting the reference electrode-cathode potential to achieve zero current flow between the anode and cathode in the absence of chlorine or bromine in said apparatus, means for comparing said reference electrode-cathode potential necessary to obtain zero current with the reference electrode-cathode potential occurring while chlorine is in said cathode electrode containing chamber and for deriving a signal responsive to any potential difference, means utilizing said derived signal for controlling the anode-cathode potential to maintain a desired reference-cathode potential, and means for measuring the current required to reduce the chlorine or bromine introduced into said cathode electrode containing chamber.

2. Apparatus in accordance with claim 1, wherein said cathode electrode is made of platinum.

3. Apparatus in accordance with claim 1, wherein said means for intermittently introducing predetermined amounts of gas mixture comprises an extendable and retractable plunger element having a sample pickup part which communicates with said cathode chamber when retracted and with a chlorine or bromine containing mixture when extended.

4. Apparatus in accordance with claim 1, wherein said means for measuring said current comprises an integrating circuit.

5. Apparatus in accordance with claim 1, wherein said reference electrode is contained in a third chamber in which electrolytic contact is maintained with said cathode electrode.

6. Apparatus in accordance with claim 1, wherein said means for comparing said reference electrode-cathode potential includes a differential amplifier.

References Cited
UNITED STATES PATENTS

| | | | |
|---|---|---|---|
| 2,832,734 | 4/1958 | Eckfeldt | 204—195 T |
| 2,886,496 | 5/1959 | Eckfeldt | 204—1 T |
| 3,032,493 | 5/1962 | Coulson et al. | 204—195 |
| 3,377,256 | 4/1968 | Sambucetti et al. | 204—195 R |
| 3,448,031 | 6/1969 | Robinson | 204—195 T |
| 3,441,490 | 4/1969 | Johansson | 204—195 T |
| 3,498,888 | 3/1970 | Johansson | 204—195 T |

TA-HSUNG TUNG, Primary Examiner

U.S. Cl. X.R.

204—1 T, 195 T